(12) United States Patent
Zatorski et al.

(10) Patent No.: US 11,606,011 B2
(45) Date of Patent: Mar. 14, 2023

(54) ELECTRIC MACHINE

(71) Applicant: General Electric Company, Schenectady, NY (US)

(72) Inventors: Darek Tomasz Zatorski, Fort Wright, KY (US); Mohamed Osama, Garching (DE); Christopher Charles Glynn, Clearwater Beach, FL (US)

(73) Assignee: General Electric Company, Schenectady, NY (US)

( * ) Notice: Subject to any disclaimer, the term of this patent is extended or adjusted under 35 U.S.C. 154(b) by 114 days.

(21) Appl. No.: 16/989,141

(22) Filed: Aug. 10, 2020

(65) Prior Publication Data

US 2022/0045587 A1    Feb. 10, 2022

(51) Int. Cl.
| | |
|---|---|
| *H02K 21/02* | (2006.01) |
| *B64D 27/02* | (2006.01) |
| *B64D 27/10* | (2006.01) |
| *B64D 27/24* | (2006.01) |
| *B64D 31/00* | (2006.01) |
| *F01D 15/10* | (2006.01) |
| *H02K 7/18* | (2006.01) |
| *H02K 21/22* | (2006.01) |

(52) U.S. Cl.
CPC .......... *H02K 21/027* (2013.01); *B64D 27/02* (2013.01); *B64D 27/10* (2013.01); *B64D 27/24* (2013.01); *B64D 31/00* (2013.01); *F01D 15/10* (2013.01); *H02K 7/1823* (2013.01); *H02K 21/22* (2013.01)

(58) Field of Classification Search
CPC .... H02K 21/027; H02K 7/1823; H02K 21/22; B64D 27/02; B64D 27/10; B64D 27/24; B64D 31/00

USPC .......................................................... 290/52
See application file for complete search history.

(56) References Cited

U.S. PATENT DOCUMENTS

| | | | |
|---|---|---|---|
| 3,571,637 A | 3/1971 | Henningsen et al. | |
| 5,300,848 A | 4/1994 | Huss et al. | |
| 7,042,128 B2 | 5/2006 | Zepp et al. | |
| 7,253,548 B2 | 8/2007 | Dooley et al. | |
| 7,385,332 B2 | 6/2008 | Himmelmann et al. | |
| 8,354,768 B2 | 1/2013 | Cipriani | |
| 8,890,350 B2 * | 11/2014 | Brust | F02C 7/32 290/52 |
| 9,714,609 B2 | 7/2017 | French et al. | |
| 10,355,568 B2 | 7/2019 | Gieras | |
| 2010/0264768 A1 | 10/2010 | Alfermann et al. | |
| 2018/0051701 A1 * | 2/2018 | Kupiszewski | F02C 3/04 |
| 2018/0269737 A1 | 9/2018 | Niergarth et al. | |

(Continued)

FOREIGN PATENT DOCUMENTS

| | | | | |
|---|---|---|---|---|
| CN | 108964393 A | 12/2018 | | |
| EP | 3832102 A1 * | 6/2021 | ................ | F02C 7/36 |
| WO | WO95/27326 A1 | 10/1995 | | |

*Primary Examiner* — Charles Reid, Jr.
(74) *Attorney, Agent, or Firm* — Dority & Manning, P.A.

(57) ABSTRACT

An electric machine is provided. The electric machine defines a centerline and includes: a stator assembly; a rotor assembly rotatable relative to the stator assembly about the centerline; and an actuator coupled to the rotor assembly, the stator assembly, or both for moving the rotor assembly, the stator assembly, or both along the centerline between a first position and a second position, the rotor assembly positioned closer to the stator assembly when in the first position than when in the second position.

17 Claims, 6 Drawing Sheets

(56) References Cited

U.S. PATENT DOCUMENTS

2019/0097479 A1 3/2019 Chong et al.
2019/0140495 A1 5/2019 Gajanayake

* cited by examiner

ELECTRIC MACHINE

FIELD

The present subject matter relates generally to an electric machine having one or more features enabling the electric machine to be modulated from a fully enabled mode.

BACKGROUND

Typical aircraft propulsion systems include one or more gas turbine engines. For certain propulsion systems, the gas turbine engines generally include a fan and a core arranged in flow communication with one another. Additionally, the core of the gas turbine engine general includes, in serial flow order, downstream of the fan, a compressor section, a combustion section, a turbine section, and an exhaust section. In operation, air is provided from the fan to an inlet of the compressor section where one or more axial compressors progressively compress the air until it reaches the combustion section. Fuel is mixed with the compressed air and burned within the combustion section to provide combustion gases. The combustion gases are routed from the combustion section to the turbine section. The flow of combustion gasses through the turbine section drives the turbine section and is then routed through the exhaust section, e.g., to atmosphere.

For certain aircraft propulsion systems, and aircraft incorporating such aircraft propulsion systems, it may be beneficial for the propulsion system to include an electric machine to, e.g., generate electrical power for various accessory systems of the gas turbine engines and/or the aircraft, for electric or hybrid electric propulsion devices, etc. One issue with permanent magnet electric machines is that in the event of a fault condition, such as a short within a stator coil, continued rotation of the rotor continues to generate a magnetic flux/electric flow through such fault, potentially creating high temperatures. When the electric machine is tied to an integral part of the aircraft propulsion system, such as a primary gas turbine engine, it may not be practical to shut down the gas turbine engine to prevent rotation of the rotor of the electric machine.

Accordingly, a propulsion system for an aircraft having an electric machine capable of addressing one or more of these issues would be useful.

BRIEF DESCRIPTION

Aspects and advantages of the invention will be set forth in part in the following description, or may be obvious from the description, or may be learned through practice of the invention.

In one embodiment of the present disclosure, an electric machine is provided. The electric machine defines a centerline and includes: a stator assembly; a rotor assembly rotatable relative to the stator assembly about the centerline; and an actuator coupled to the rotor assembly, the stator assembly, or both for moving the rotor assembly, the stator assembly, or both along the centerline between a first position and a second position, the rotor assembly positioned closer to the stator assembly when in the first position than when in the second position.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION

Figure 1:
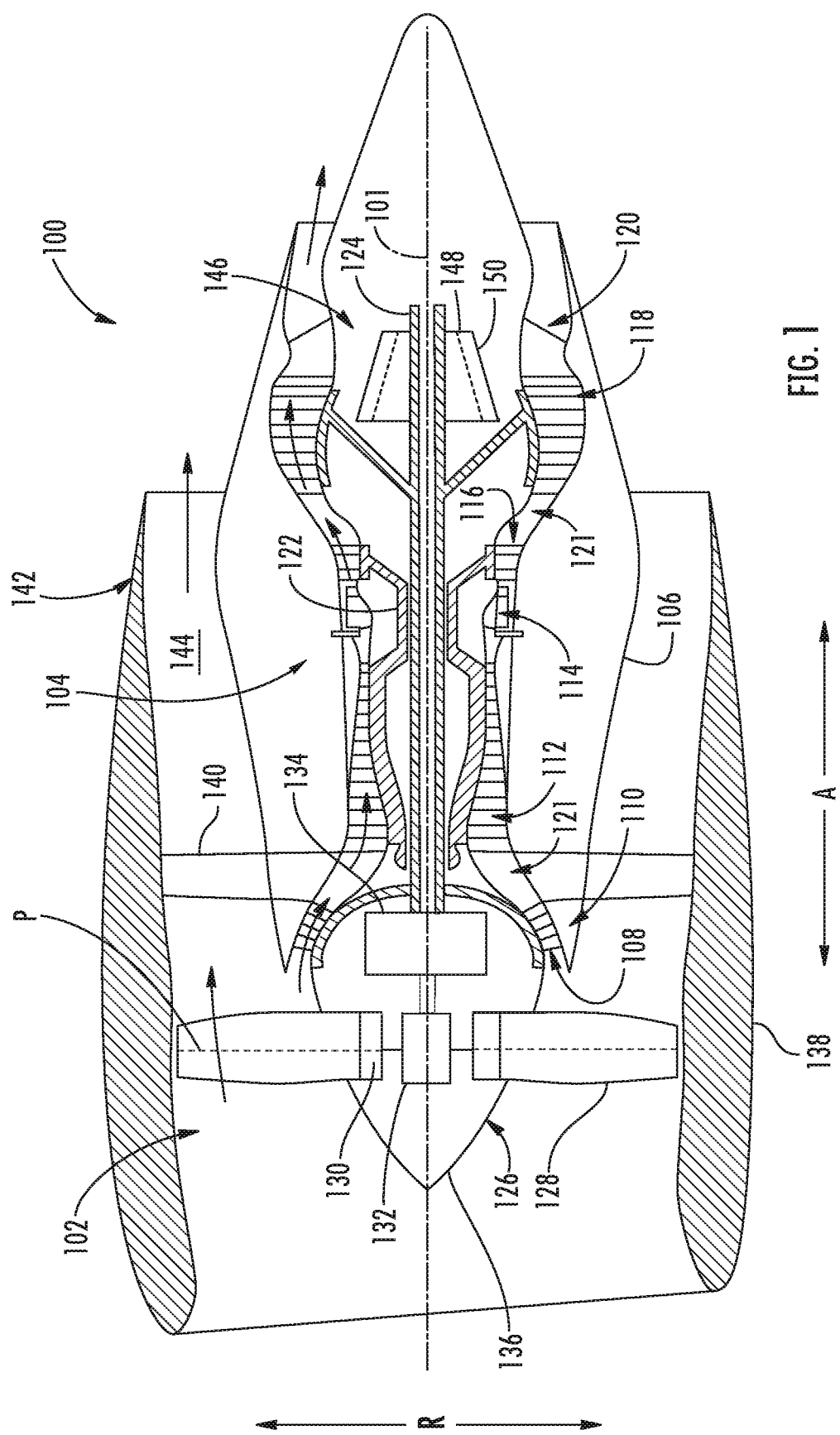
FIG. 1 is a schematic, cross-sectional view of a gas turbine engine in accordance with an exemplary aspect of the present disclosure.

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention.

As used herein, the terms "first", "second", and "third" may be used interchangeably to distinguish one component from another and are not intended to signify location or importance of the individual components.

The terms "forward" and "aft" refer to relative positions within a gas turbine engine or vehicle, and refer to the normal operational attitude of the gas turbine engine or vehicle. For example, with regard to a gas turbine engine, forward refers to a position closer to an engine inlet and aft refers to a position closer to an engine nozzle or exhaust.

The terms "upstream" and "downstream" refer to the relative direction with respect to fluid flow in a fluid pathway. For example, "upstream" refers to the direction from which the fluid flows, and "downstream" refers to the direction to which the fluid flows.

The terms "coupled," "fixed," "attached to," and the like refer to both direct coupling, fixing, or attaching, as well as indirect coupling, fixing, or attaching through one or more intermediate components or features, unless otherwise specified herein.

The singular forms "a", "an", and "the" include plural references unless the context clearly dictates otherwise.

Approximating language, as used herein throughout the specification and claims, is applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 10 percent margin.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

Referring now to the drawings, wherein identical numerals indicate the same elements throughout the figures, FIG. 1 is a schematic cross-sectional view of a propulsion engine in accordance with an exemplary embodiment of the present disclosure. In certain exemplary embodiments, the propulsion engine may be configured a high-bypass turbofan jet engine 100, herein referred to as "turbofan 100." The turbofan 100 may be incorporated into an aircraft propulsion system, e.g., as an under-wing mounted turbofan engine. Alternatively, however, in other embodiments, the turbofan 100 may be incorporated into any other suitable aircraft or propulsion system.

As shown in FIG. 1, the exemplary turbofan 100 depicted defines an axial direction A (extending parallel to a longitudinal centerline 101 provided for reference), a radial direction R, and a circumferential direction C (extending about the axial direction A; not depicted in FIG. 1). In general, the turbofan 100 includes a fan section 102 and a core turbine engine 104 disposed downstream from the fan section 102.

The exemplary core turbine engine 104 depicted generally includes a substantially tubular outer casing 106 that defines an annular inlet 108. The outer casing 106 encases, in serial flow relationship, a compressor section including a booster or low pressure (LP) compressor 110 and a high pressure (HP) compressor 112; a combustion section 114; a turbine section including a high pressure (HP) turbine 116 and a low pressure (LP) turbine 118; and a jet exhaust nozzle section 120. The compressor section, combustion section 114, and turbine section together define a core air flowpath 121 extending from the annular inlet 108 through the LP compressor 110, HP compressor 112, combustion section 114, HP turbine section 116, LP turbine section 118 and jet nozzle exhaust section 120. A high pressure (HP) shaft or spool 122 drivingly connects the HP turbine 116 to the HP compressor 112. A low pressure (LP) shaft or spool 124 drivingly connects the LP turbine 118 to the LP compressor 110.

For the embodiment depicted, the fan section 102 includes a variable pitch fan 126 having a plurality of fan blades 128 coupled to a disk 130 in a spaced apart manner. As depicted, the fan blades 128 extend outwardly from disk 130 generally along the radial direction R. Each fan blade 128 is rotatable relative to the disk 130 about a pitch axis P by virtue of the fan blades 128 being operatively coupled to a suitable actuation member 132 configured to collectively vary the pitch of the fan blades 128 in unison. The fan blades 128, disk 130, and actuation member 132 are together rotatable about the longitudinal axis 101 by LP shaft 124 across a power gear box 134. The power gear box 134 includes a plurality of gears for stepping down the rotational speed of the LP shaft 124 to a more efficient rotational fan speed.

Referring still to the exemplary embodiment of FIG. 1, the disk 130 is covered by rotatable front hub 136 aerodynamically contoured to promote an airflow through the plurality of fan blades 128. Additionally, the exemplary fan section 102 includes an annular fan casing or outer nacelle 138 that circumferentially surrounds the fan 126 and/or at least a portion of the core turbine engine 104. The nacelle 138 is supported relative to the core turbine engine 104 by a plurality of circumferentially-spaced outlet guide vanes 140. A downstream section 142 of the nacelle 138 extends over an outer portion of the core turbine engine 104 so as to define a bypass airflow passage 144 therebetween.

Additionally, the exemplary turbofan 100 depicted includes an electric machine 146 rotatable with one or more rotatable components of the turbofan 100. Specifically, for the embodiment shown, the turbofan 100 is rotatable with the low pressure system of the turbofan 100, including the LPshaft 124. Specifically, for the embodiment depicted, the electric machine 146 is arranged co-axially with and mounted to the LP shaft 124 (the LP shaft 124 also rotating the fan 126 through, for the embodiment depicted, the power gearbox 134). As used herein, "co-axially" refers to the axes being aligned. It should be appreciated, however, that in other embodiments, an axis of the electric machine 146 may be offset radially from the axis of the LP shaft 124 and further may be oblique to the axis of the LP shaft 124, such that the electric machine 146 may be positioned at any suitable location at least partially inward of the core air flowpath 121.

The electric machine 146 includes a rotor assembly 148 and a stator assembly 150. For the embodiment depicted, the rotor assembly 148 and stator assembly 150 define a tapered air gap (see FIG. 2) and the rotor assembly 148 is configured to move relative to the stator assembly 150 during certain operations, as will be explained in more detail below.

It should be also appreciated, however, that the exemplary turbofan engine 100 depicted in FIG. 1 is provided by way of example only, and that in other exemplary embodiments, the turbofan engine 100 may have any other suitable configuration. For example, in other exemplary embodiments, the turbofan engine 100 may be configured as a turboprop engine, a turbojet engine, a differently configured turbofan engine, or any other suitable gas turbine engine. Additionally, or alternatively, exemplary aspects of the present disclosure (such as the electric machine 146) may be incorporated into or otherwise utilized with any other suitable type of engine, such as an aeroderivative gas turbine engine, a nautical gas turbine engine, a power generation gas turbine engine, an internal combustion engine, etc., or further with any other machine having rotating components.

Figure 2:
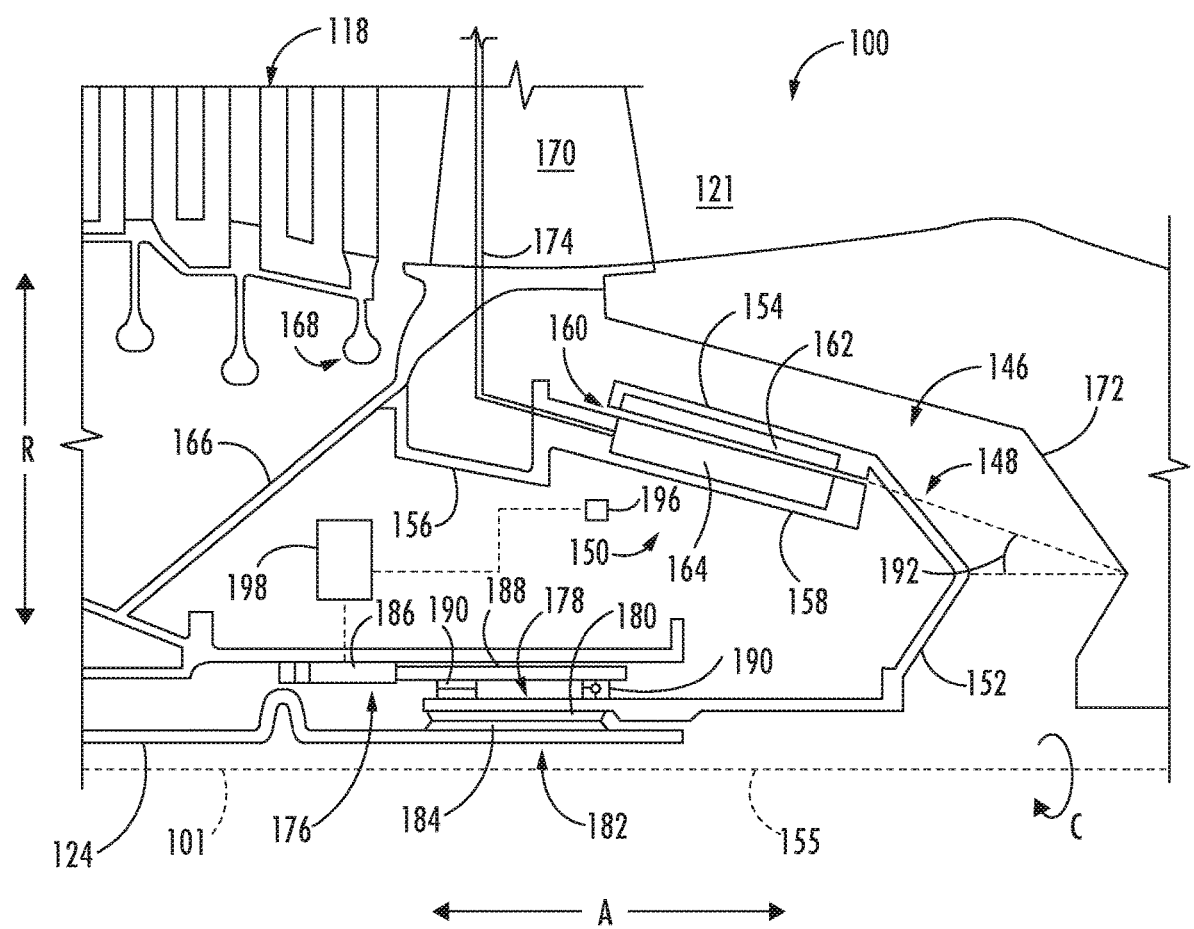
FIG. 2 is a schematic, cross-sectional view of an electric machine embedded in a gas turbine engine in accordance with an exemplary embodiment of the present disclosure in a first position.

Referring now to FIG. 2, an electric machine 146 embedded within a gas turbine engine in accordance with an exemplary embodiment of the present disclosure is depicted. In certain exemplary embodiments, the electric machine 146 and gas turbine engine depicted in FIG. 2 may be configured in substantially the same manner as the exemplary electric machine 146 and turbofan engine 100 described above with reference to FIG. 1. Accordingly, the same or similar numbers may refer to the same or similar parts.

As such, for the embodiment depicted, the electric machine 146 is embedded within a turbine section of the gas turbine engine, and more particularly still, is attached to an LP shaft 124 of the gas turbine engine. Additionally, the electric machine 146 is positioned at least partially within or aft of an LP turbine 118 of the turbine section along an axial direction A.

It will be appreciated, however, that in other exemplary embodiments, as will be explained more fully below, the electric machine 146 may be positioned at other suitable locations within the gas turbine engine.

Referring to FIG. 2, the electric machine 146 generally includes a rotor assembly 148 and a stator assembly 150 and defines a centerline 155, which for the embodiment depicted is aligned with a longitudinal axis 101 of the engine. The rotor assembly 148 generally includes a rotor connection member 152 and a rotor 154. The stator assembly 150 similarly includes stator connection member 156 and a stator 158. The rotor 154 of the rotor assembly 148 and stator 158 of the stator assembly 150 together define an air gap 160 therebetween. In the embodiment shown, the rotor 154 includes a plurality of magnets 162, such as a plurality of permanent magnets, and the stator 158 includes a plurality of windings or coils 164. As such, it will be appreciated, that the electric machine 146 may be referred to as a permanent magnet electric machine. However, in other exemplary embodiments, the electric machine 146 may be configured in any suitable manner. For example, the electric machine 146 may be configured as an electromagnetic electric machine, including a plurality of electromagnets and active circuitry, as an induction type electric machine, a switched reluctance type electric machine, a synchronous AC electric machine, an asynchronous electric machine, or as any other suitable electric generator or motor.

For the embodiment shown, the rotor assembly 148 is attached to the LP shaft 124, such that the rotor assembly 148 is rotatable with the LP shaft 124. The attachment of the rotor assembly 148 to the LP shaft 124 will be described in more detail, below.

By contrast, the stator assembly 150 is attached to a structural support assembly 166 of the turbine section. More specifically, the stator connection member 156 extends from the structural support assembly 166 to the stator 158 to support the stator 158. Notably, the structural support assembly 166 is configured as part of an aft frame assembly 168, the aft frame assembly further including an aft frame strut 170 extending through a core air flowpath 121 of the gas turbine engine and configured to provide structural support for the gas turbine engine. The structural support assembly 166 extends from an inner end of the aft frame strut 170 along the radial direction.

The gas turbine engine further includes a cavity wall 172 surrounding at least a portion of the electric machine 146. More specifically, for the embodiment depicted, the cavity wall 172 substantially completely surrounds the electric machine 146, extending from a location proximate a forward end of the electric machine 146 to a location aft of the electric machine 146. The cavity wall 172 may function as, e.g., a cooling air cavity wall, a sump for cooling fluid, a protective cover for the electric machine 146, etc. For example, in certain embodiments, the engine may further include a second cavity wall (not shown) to form a buffer cavity surrounding the electric machine 146 and thermally protect the electric machine 146.

Referring still to the embodiment of FIG. 2, during certain operations of the gas turbine engine, the LP shaft 124 may rotate the rotor assembly 148 of the electric machine 146, allowing electric machine 146 to function as an electric generator producing electrical power. Additionally, the electric machine 146 is in electrical communication with— electrically connected to—the electric communication bus 174. The electric communication bus 174 is electrically connected to the electric machine 146 at a location inward of the core air flowpath 121 along the radial direction R. The electric communication bus 174 may extend through the core air flowpath 121 (e.g., through the aft frame strut 170) and connect the electric machine 146 to various other electrical sinks (accessory systems, electric/hybrid-electric propulsion devices, etc.), electrical sources (other electric machines, electric energy storage units, etc.), or both. In such a manner, it will be appreciated that the electric machine 146 may further be operable as an electric motor during certain operations, such that the rotor assembly 148 of the electric machine 146 drives the LP shaft 124.

Figure 3:
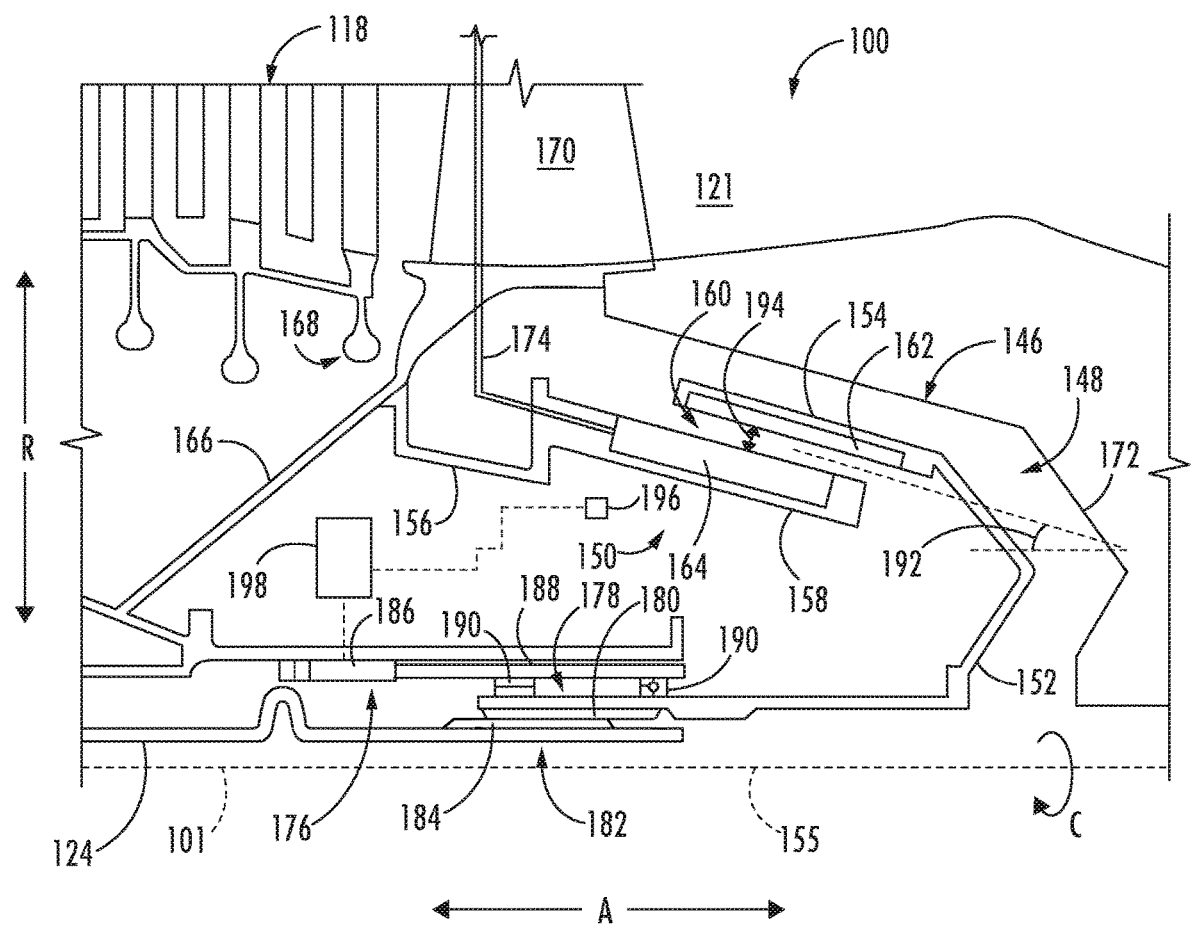
FIG. 3 is a schematic, cross-sectional view of the exemplary electric machine of FIG. 2 embedded in a gas turbine engine in a second position.

Referring now also to FIG. 3, providing another view of the exemplary electric machine 146 FIG. 2, it will be appreciated that electric machine 146 is movable between a first position and a second position, or more specifically, the rotor assembly 148 is movable relative to the stator assembly 150 between the first position, as is shown in FIG. 2, and a second position, as is shown in FIG. 3. More particularly, for the embodiment shown, the electric machine 146 further includes an actuator 176 coupled to the rotor assembly 148, the stator assembly 150, or both for moving one of the rotor assembly 148 or stator assembly 150 relative to the other of the rotor assembly 148 or stator assembly 150 along the centerline 155 of the electric machine 146 between the first position and the second position. More specifically for the embodiment shown, as described in more detail below, the actuator 176 is coupled to the rotor assembly 148 for moving the rotor assembly 148 relative to the stator assembly 150 along the centerline 155 of the electric machine 146 between the first position and the second position. As depicted, the rotor assembly 148 is positioned closer to the stator assembly 150 when in the first position than when in the second position. The first and second positions are explained in more detail below.

More particularly, as noted above, the rotor assembly 148 is coupled to the LP shaft 124 for the embodiment shown. More specifically, the rotor assembly 148 includes the rotor 154 and the rotor connection member 152. The rotor connection member 152 extends between the LP shaft 124 and the rotor 154 for connecting the rotor 154 to the LP shaft 124. For the embodiment shown, the rotor connection member 152 is connected to the LP shaft 124 through a splined connection. More particularly, the rotor connection member 152 includes a connection portion 178 having a plurality of teeth 180 extending generally along the axial direction A, and similarly, the LP shaft 124 includes a connection portion 182 having a plurality of teeth 184 extending generally along the axial direction A. The plurality of teeth 180 of the connection portion 178 of the rotor connection member 152 are configured to engage with the plurality of teeth 184 of the connection portion 182 of the LP shaft 124, fixing the two components to one another along a circumferential direction C. Notably, however, such a configuration allows for relative movement of the rotor assembly 148 relative to the LP shaft 124 along the axial direction A.

It will be appreciated, however, that in other embodiments, the rotor connection member 152 may be coupled to the LP shaft 124 in any other suitable manner allowing for relatively movement along the axial direction, while fixing the components along the circumferential direction C. For example, in other example embodiments, the rotor connection member 152 may be coupled to the LP shaft 124 using a plurality of linear bearings, linear slides, etc.

Moreover, it will further be appreciated that the actuator 176 is coupled to the rotor connection member 152 of the rotor assembly 148 for moving the rotor connection member 152 along the centerline 155 of the electric machine 146 relative to the LP shaft 124. In such a manner, the actuator 176 may move the rotor assembly 148 along the axial direction A, and along the centerline 155 of the electric machine 146, relative to the LP shaft 124.

Briefly, for the embodiment shown, the actuator 176 is a linear actuator 176, generally include a base 186 and an extension portion 188 moveable relative to the base 186 along the axial direction A. The extension portion 188 is rotatably coupled to the rotor connection member 152, supported by a plurality of bearings 190 (which for the embodiment depicted include an axial-load bearing, or rather a ball bearing). In such a manner, it will be appreciated that the rotor connection member 152 may rotate relative to the extension portion 188 along the circumferential direction C, but is fixed to the extension portion 188 along the axial direction A.

Further, it will be appreciated that the actuator 176 may be a hydraulically powered actuator, a pneumatically powered actuator, an electrically powered actuator, a thermally activated actuator, a magnetic actuator, etc. Further, still, in other embodiments, the actuator 176 may not be a linear actuator, and instead may be a scissor-actuator, a circular to linear actuator (such as a screw actuator), or any other actuator capable of creating a linear movement.

Referring still to the embodiment of FIG. 2, for the embodiment depicted it will be appreciated that the actuator 176 is further coupled to the structural support assembly 166 of the turbine section, which as noted above, is part of an aft frame assembly 168 having the aft frame strut 170. In such manner, it will be appreciated that the actuator 176 is coupled to the same frame as the stator assembly 150. Notably, such a configuration may ensure the air gap 160 defined between the rotor 154 of the rotor assembly 148 and the stator 158 of the stator assembly 150 is maintained at a desired value during operation of the gas turbine engine having the electric machine 146 described herein. More specifically, as will be appreciated, as the gas turbine engine changes operating conditions, a temperature of various components may increase or decrease. For example, the LP shaft 124 may increase in temperature, which may cause the LP shaft 124 to increase in length along the axial direction A. The connection of the actuator 176 to the same frame as the stator assembly 150, along with the splined connection between the rotor connection member 152 and the LP shaft 124, may ensure that any increase or decrease in length of the LP shaft 124 does not appreciably affect a size of the air gap 160 defined between the rotor 154 of the rotor assembly 148 and the stator 158 of the stator assembly 150.

Referring still to FIGS. 2 and 3, it will be appreciated that for the embodiment shown, the first position is an engaged position and the second position is a disengaged position. As used herein, the term "engaged position" refers to a relative positioning of the rotor 154 of the rotor assembly 148 to the stator 158 of the stator assembly 150 in which the electric machine 146 is capable of operating within a reasonable margin of error of the design efficiency for the electric machine 146. For example, in the engaged position, the air gap 160 defined between the rotor 154 of the rotor assembly 148 and the stator 158 of the stator assembly 150 may be within a reasonable margin of an optimal design value, enabling a desired portion of magnetic flux from the magnets 162 of the rotor 154 to reach the stator 158. By contrast, as used herein, the term "disengaged position" refers to a relative positioning of the rotor 154 of the rotor assembly 148 to the stator 158 of the stator assembly 150 in which the electric machine 146 is not capable of operating with a reasonable efficiency (e.g., with an efficiency less than 10% of a maximum efficiency).

Moreover, for the embodiment shown, it will be appreciated that the electric machine 146 is integrated into an interior position of the gas turbine engine (inward of a core air flowpath 121), wherein there may not be an excess amount of space. Accordingly, in order to facilitate the movement of the rotor assembly 148 relative to the stator assembly 150 between the engaged position and the disengaged position, the air gap 160 defines an angle 192 relative to the centerline 155 of the electric machine 146 greater than 0 degrees and less than 90. More specifically, for the embodiment shown, the angle 192 defined by the air gap 160 relative to the centerline 155 of the electric machine 146 is greater than 10 degrees in less than 45 degrees, such as less than 30 degrees. Such a configuration may facilitate movement between the engaged position and the disengaged position without requiring an excess amount of movement of the rotor assembly 148 relative to the stator assembly 150 along the centerline 155 of the electric machine 146.

For example, for the embodiment shown, a size of the air gap 160 (a distance 194, shown in FIG. 3) may be a first value when the rotor assembly 148 is in the engaged position relative to the stator assembly 150, and may be equal to a second value when the rotor assembly 148 is in the disengaged position relative to the stator assembly 150. In at least certain exemplary embodiments, the second value is at least two times larger than the first value, such as at least four times larger than the first value, such as at least five times larger than the first value, such as up to 200 times larger than the first value, such as up to 100 times larger than the first value, such as up to 20 times larger than the first value.

Further, given the angle 192 the air gap 160 defines the centerline 155, such may be achieved with relatively small movements along the centerline 155. For example, in embodiments, the actuator 176 may be configured to move the rotor 154 simply a distance along the centerline 155 relative to the stator assembly 150 between the engaged position and the disengaged position, with the distance being greater than 0.5 inches and less than 10 inches, such as greater than 1 inch and less than 5 inches.

An electric machine 146 configured in accordance with one or more these exemplary embodiments may provide for an extra layer of safety in the event of a failure of the electric machine 146. More specifically, as will be appreciated, in the event of a short or other fault within the stator 158 of the stator assembly 150 (e.g., within a winding or coil 164), continued rotation of the rotor 154 of the rotor assembly 148 relative to the stator 158, when the rotor assembly 148 is in the engaged position relative to the stator assembly 150, may create excess heat, potentially damaging other components within the gas turbine engine. By utilizing an actuator 176 to move the rotor assembly 148 from the engaged position to the disengaged position, the gas turbine engine may continue to operate without risking such additional damage to the gas turbine engine. Such may be particularly useful when the gas turbine engine is, e.g., an aeronautical gas turbine engine crating thrust for an aircraft.

In such a manner, briefly it will be appreciated that the exemplary electric machine 146 depicted further includes one or more sensors 196 and a controller 198 operable with the actuator 176 and the one or more sensors 196. The controller 198 may be configured to receive data from the one or more sensors 196 which may be indicative of a fault within the electric machine 146. For example, the one or more sensors 196 may be, e.g., one or more temperature sensors 196 configured to sense data indicative of a temperature of the stator 158 of the stator assembly 150. If the data sensed by the one or more sensors 196 indicates that a temperature of the stator 158 of the stator assembly 150 is in excess of a certain threshold, such may be indicative of a fault within the electric machine 146. The controller 198 may actuate the actuator 176 to move the rotor assembly 148 from the first position, or rather the engaged position, to the second position, or rather the disengaged position, in response to receiving data from the one more sensors 196 indicative of the fault within the electric machine 146.

It will be appreciated that although the controller 198 is depicted at a location proximate to the electric machine 146, in other embodiments, the controller 198 may be located at any suitable position within the gas turbine engine, or elsewhere (e.g., within an aircraft including the engine, at a remote location, etc.); may be a stand-alone controller, or may be integrated into an existing controller for the engine (e.g., a FADEC); etc.

In such a manner, the controller 198 may prevent a fault within the electric machine 146 from damaging other components of the gas turbine engine.

In addition to the above functionality, it should be appreciated that the actuator 176 may be configured to additionally move the rotor assembly 148 along the centerline 155 to one or more of a partial power positions located between the first position and the second position, or rather between the engaged position and the disengaged position. In such manner, the actuator 176 may be configured to move the rotor assembly 148 relative to stator assembly 150 in order to affect an efficiency of the electric machine 146, to effectively control an amount of power extracted by the electric machine 146 (or provided to the engine). In such manner, it will be appreciated that the controller 198 may further be configured to move the rotor assembly 148 relative to the stator assembly 150 to control an amount of power extraction from the electric machine 146.

Figure 4:
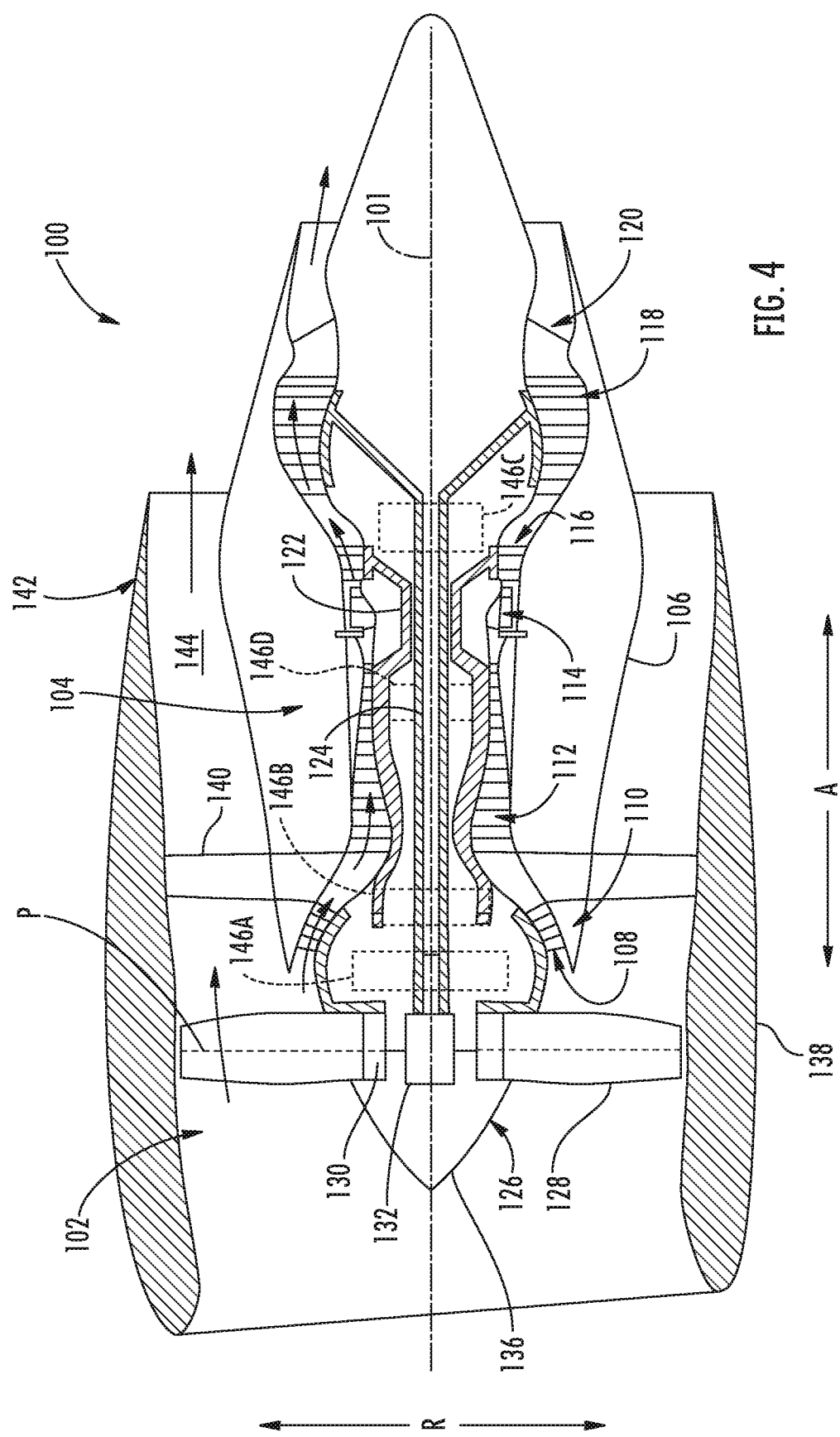
FIG. 4 is a schematic, cross-sectional view of a gas turbine engine in accordance with another exemplary embodiment of the present disclosure.

It will further be appreciated that the exemplary electric machine 146 and gas turbine engine depicted in FIGS. 2 and 3 is provided by way of example only. In other exemplary embodiments, the electric machine 146 and gas turbine engine may have any other suitable configuration. For example, in other exemplary embodiments, the electric machine may be positioned in any other suitable location within the gas turbine engine. For example, referring briefly to FIG. 4, a gas turbine engine (or rather turbofan 100) configured in a manner similar to exemplary gas turbine engine of FIG. 1 is provided. As indicated by the phantom lines, it will be appreciated that the exemplary gas turbine engine may include an electric machine 146 at various other suitable locations. For example, the gas turbine engine may include a first electric machine 146A coupled to the LP shaft 124 at a location forward of an LP compressor 110. Additionally, or alternatively, the gas turbine engine may include a second electric machine 146B coupled to the LP shaft 124, and HP shaft, or both within the compressor section at a location forward of the HP compressor 112. Additionally, or alternatively, still, the gas turbine engine may include a third electric machine 146C coupled to the LP shaft 124, the HP shaft, or both within the compressor section at a location inward of the HP compressor 112. Additionally, alternatively, still, the gas turbine engine may include a fourth electric machine 146D coupled with the LP shaft 124 within the turbine section, at a location forward of the LP turbine 118.

Figure 5:
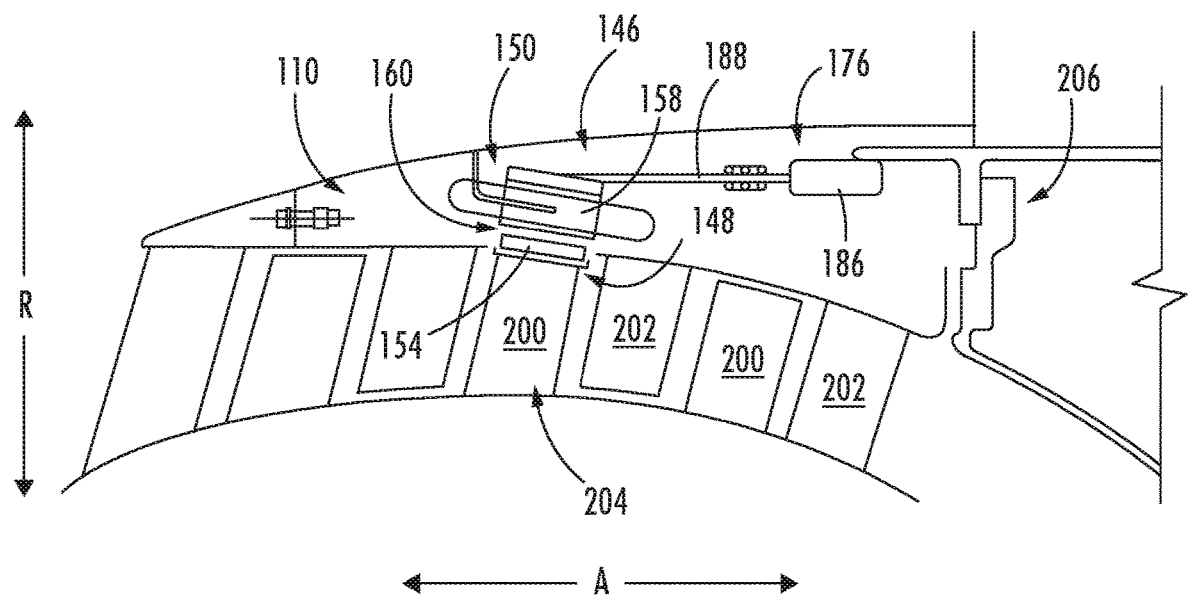
FIG. 5 is a schematic, cross-sectional view of an electric machine embedded in a gas turbine engine in accordance with another exemplary embodiment of the present disclosure in a first position.
Figure 6:
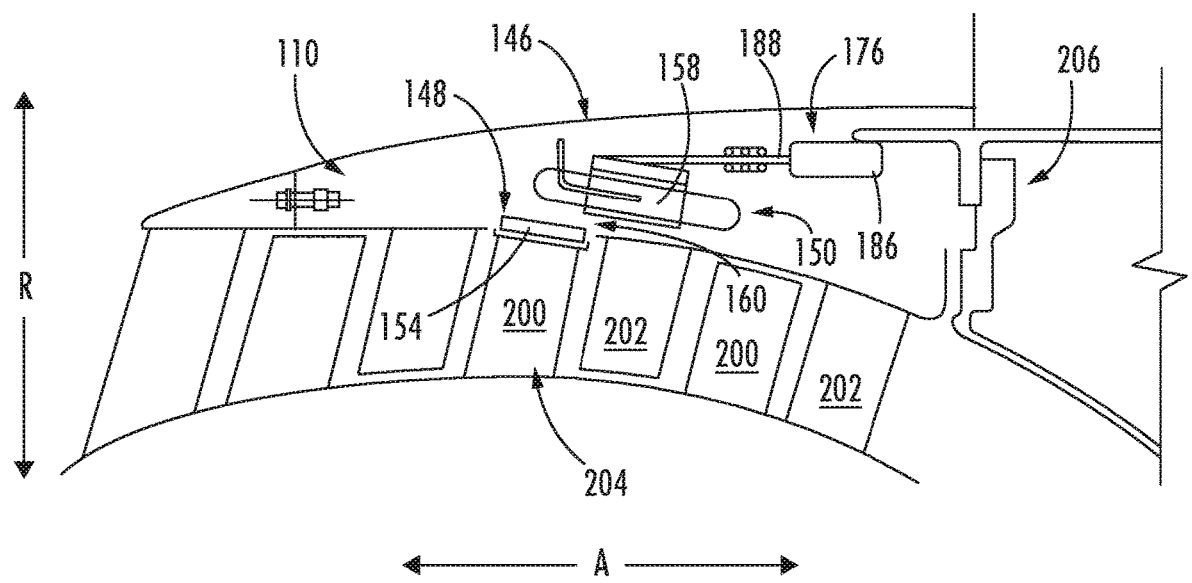
FIG. 6 is a schematic, cross-sectional view of the exemplary electric machine of FIG. 5 embedded in a gas turbine engine in a second position.

Moreover, in still other embodiments, a gas turbine engine may be provided having an electric machine 146 in accordance with one or more exemplary embodiments of the present disclosure at still other suitable location. For example, referring now to FIGS. 5 and 6, close-up, schematic, cross-sectional views are provided of an LP compressor 110, or booster compressor, of a gas turbine engine having an electric machine 146 in accordance with an exemplary embodiment of the present disclosure. FIG. 5 provides a view of the exemplary electric machine 146 in a first position, and FIG. 6 provides a view of the exemplary electric machine 146 in a second position.

The LP compressor 110 of the gas turbine engine depicted generally includes a plurality of LP compressor rotor blades 200 and a plurality of LP compressor stator vanes 202. The plurality of LP compressor rotor blades 200 includes a plurality of stages 204 of LP compressor rotor blades 200 spaced along an axial direction A of the gas turbine engine. The gas turbine engine further includes a frame assembly 206, which may be a compressor forward frame. For the embodiment shown the certain of the LP compressor stator vanes 202 are coupled to the frame assembly 206.

Further, as noted above, the exemplary gas turbine engine includes an electric machine 146 configured in accordance with an exemplary embodiment of the present disclosure. In such manner, will be appreciated that the exemplary electric machine 146 generally includes a stator assembly 150 and a rotor assembly 148 rotatable about a centerline 155 (not depicted in FIGS. 5 and 6; the centerline 155 aligned with an engine centerline) relative to the stator assembly 150. The rotor assembly 148 includes a rotor 154 and the stator assembly 150 includes a stator 158, with the rotor 154 and the stator 158 defining an air gap 160 therebetween.

Moreover, the exemplary electric machine 146 includes an actuator 176 coupled to the rotor assembly 148, the stator assembly 150, or both for moving the rotor assembly 148 or the stator assembly 150 relative to the other of the rotor assembly 148 or the stator assembly 150 along the centerline 155 between the first position and a second position.

However, for the exemplary embodiment of FIGS. 5 and 6, the actuator 176 is more specifically coupled to the stator assembly 150 for moving the stator assembly 150 relative to the rotor assembly 148 along the centerline 155 between the first position and a second position. As with the embodiment above, the first position is an engaged position, as depicted in FIG. 5, and the second position is a disengaged position, as is depicted in FIG. 6. As will be appreciated, the rotor assembly 148 is positioned closer to the stator assembly 150 when in the engaged position as compared to when in the disengaged position.

Further for the exemplary embodiment of FIGS. 5 and 6, the rotor assembly 148 is not coupled to an LP shaft 124 of the engine, and instead is coupled to a plurality of rotor blades of the gas turbine engine at a location outward of the plurality rotor blades of the gas turbine engine along a radial direction R of the gas turbine engine. More specifically, for the embodiment depicted, the plurality of rotor blades is a plurality of LP compressor rotor blades 200 in a stage 204 of LP compressor blades 200.

It will be appreciated that in still other exemplary embodiments, the gas turbine engine, electric machine 146, or both may have still other suitable configurations. Further, although the exemplary electric machine 146 described herein is depicted within and described with a gas turbine engine, in other exemplary embodiments, the exemplary electric machine 146 may be utilized with any other suitable machine having at least one rotating component (motor or otherwise; aeronautical or otherwise; etc.).

Figure 7:
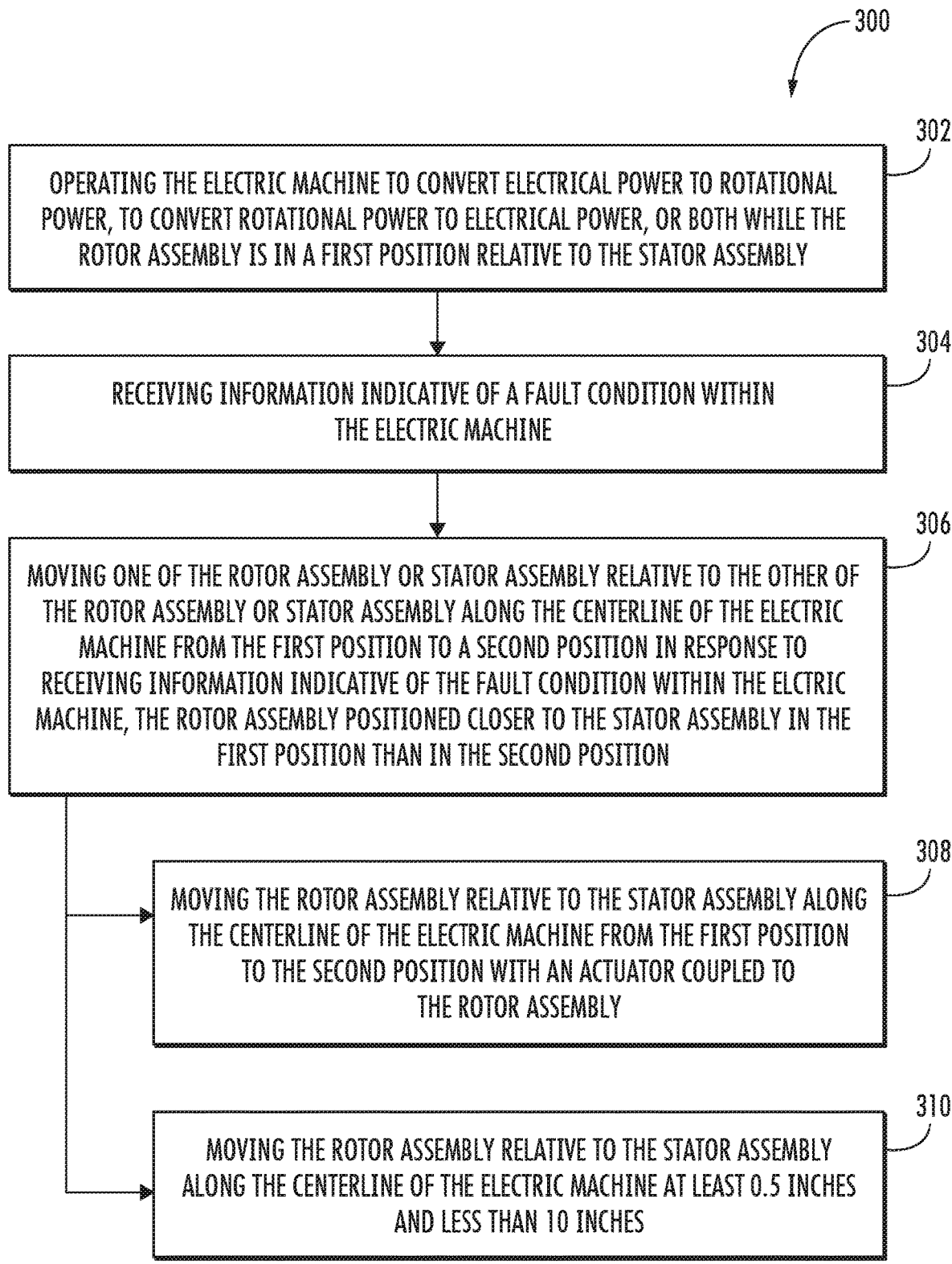
FIG. 7 is a flow diagram of a method for operating an electric machine in accordance with an exemplary aspect of the present disclosure.

Referring now to FIG. 7, a flow diagram of a method 300 of operating an electric machine in accordance with an exemplary aspect of the present disclosure is depicted. In certain exemplary aspects, the method may utilize one or more of the exemplary electric machines described above with reference to FIGS. 1 through 6. Accordingly, in certain exemplary aspects the electric machine may include a stator assembly and a rotor assembly, and may define a centerline.

As is depicted, the method 300 includes at (302) operating the electric machine to convert electrical power to rotational power, to convert rotational power to electrical power, or both while the rotor assembly is in a first position relative to the stator assembly. For example, operating the electric machine at (302) may include operating the electric machine to convert rotational power of an engine (such as an aeronautical gas turbine engine) to electrical power during a flight operation, such as a takeoff operation, a climb operation, a cruise operation, and/or a descent operation, or alternatively during a ground operation.

Further, for the aspect depicted, the method 300 includes at (304) receiving information indicative of a fault condition within the electric machine. Receiving information indicative of the fault condition within the electric machine at (304) may include receiving information indicative of a short within a stator winding or coil of the stator assembly. For example, receiving information indicative of the fault condition within the electric machine at (304) may include receiving information indicative of a temperature of one or more aspects of the stator assembly.

As is also depicted in FIG. 7, the method 300 further includes at (306) moving one of the rotor assembly or stator assembly relative to the other of the rotor assembly or stator assembly along the centerline of the electric machine from the first position to a second position in response to receiving information indicative of the fault condition within the electric machine, the rotor assembly positioned closer to the stator assembly in the first position than in the second position.

In at least certain exemplary aspects, such as the exemplary aspect of FIG. 7, moving one of the rotor assembly or stator assembly relative to the other of the rotor assembly or stator assembly along the centerline of the electric machine from the first position to a second position at (306) includes at (308) moving the rotor assembly relative to the stator assembly along the centerline of the electric machine from the first position to the second position with an actuator coupled to the rotor assembly.

Further for the exemplary aspect of FIG. 7, it will be appreciated that the rotor assembly and stator assembly together define an air gap therebetween. The air gap defines an angle relative to the centerline greater than zero degrees and less than 90 degrees. With such an exemplary aspect, moving one of the rotor assembly or stator assembly relative to the other of the rotor assembly or stator assembly along the centerline of the electric machine from the first position to a second position at (306) further includes at (310) moving the rotor assembly relative to the stator assembly along the centerline of the electric machine at least 0.5 inches and less than 10 inches. The inclination of the air gap allows the rotor assembly or stator assembly to be moved a relatively short distance while still obtaining a desired separation between the rotor assembly and stator assembly.

Additionally or alternatively, it should be appreciated that the method 300 may be configured to additionally move the rotor assembly or stator assembly along the centerline to one or more a positions between the first position and second position, or rather between an engaged position and a disengaged position. In such manner, the method 300 may be configured to move the rotor assembly, the stator assembly, or both in order to affect an efficiency of the electric machine, so as to effectively control an amount of power extracted by the electric machine (or provided to an engine including the electric machine). In such manner, it will be appreciated that the method 300 may further be configured to move the rotor assembly, the stator assembly, or both along the centerline to control an amount of power extraction from the electric machine or power provided to an engine including the electric machine. For example, the method 300 may determine that addition power extraction is required or desired, and in response may move the rotor assembly, the stator assembly, or both to reduce the air gap and increase a power extraction. Additionally, or alternatively, the method 300 may determine that a lesser amount of power extraction is required or desired, and in response may move the rotor assembly, the stator assembly, or both to increase the air gap and reduce a power extraction. Additionally, or alternatively still, the method 300 may determine that addition power is required or desired to be provided to an engine including the electric machine, and in response may move the rotor assembly, the stator assembly, or both to reduce the air gap and increase a power provided to the engine. Additionally, or alternatively still, the method 300 may determine that a lesser amount power is required or desired to be provided to the engine including the electric machine, and in response may move the rotor assembly, the stator assembly, or both to increase the air gap and reduce a power provided to the engine.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

Additional exemplary aspects will be described below with respect to the following clauses:

An electric machine defining a centerline and comprising: a stator assembly; a rotor assembly rotatable relative to the stator assembly about the centerline; and an actuator coupled to the rotor assembly, the stator assembly, or both for moving the rotor assembly, the stator assembly, or both along the centerline between a first position and a second position, the rotor assembly positioned closer to the stator assembly when in the first position than when in the second position.

The electric machine of one or more of these clauses, wherein the first position is an engaged position, and wherein the second position is a disengaged position.

The electric machine of one or more of these clauses, wherein the rotor assembly and the stator assembly together define an air gap, and wherein the air gap defines an angle relative to the centerline greater than zero degrees and less than 90 degrees.

The electric machine of one or more of these clauses, wherein the angle defined by the air gap relative to the centerline is greater than 10 degrees and less than 45 degrees.

The electric machine of one or more of these clauses, wherein the air gap is equal to a first value when the rotor assembly is in the first position and is equal to a second value when the rotor assembly is in the second position, and wherein the second value is at least two times larger than the first value and up to 200 times larger than the first value.

The electric machine of one or more of these clauses, wherein the actuator is configured to move the rotor assembly a distance along the centerline of the electric machine between the first position and the second position, wherein the distance is greater than 0.5 inches and less than 10 inches.

The electric machine of one or more of these clauses, wherein the distance is greater than 1 inch and less than 5 inches.

The electric machine of one or more of these clauses, further comprising: a controller operable with the actuator, wherein the controller is configured to move the rotor assembly from the first position to the second position in response to receiving data indicative of a fault within the electric machine.

The electric machine of one or more of these clauses, wherein the actuator is further configured to move the rotor assembly along the centerline to a partial power position located between the first position and the second position.

The electric machine of one or more of these clauses, wherein the actuator is coupled to the rotor assembly for moving the rotor assembly relative to the stator assembly.

A gas turbine engine defining an engine centerline and comprising: a turbomachine comprising a rotating assembly configured to rotate about the centerline; and an electric machine defining an electric machine centerline, the electric machine comprising: a stator assembly; a rotor assembly rotatable with the rotating assembly of the turbomachine relative to the stator assembly about the electric machine centerline; and an actuator coupled to the rotor assembly, the stator assembly, or both for moving the rotor assembly, the stator assembly, or both along the electric machine centerline between a first position and a second position, the rotor assembly positioned closer to the stator assembly when in the first position than when in the second position.

The gas turbine engine of one or more of these clauses, wherein the rotor assembly and stator assembly together define an air gap therebetween, the air gap defining an angle relative to the electric machine centerline greater than zero degrees and less than 90 degrees.

The gas turbine engine of one or more of these clauses, wherein the turbomachine comprises a turbine, wherein the rotating assembly comprises a shaft rotatable with the turbine, wherein the rotor assembly comprises a connection assembly and a rotor, and wherein the connection assembly extends between the shaft and the rotor.

The gas turbine engine of one or more of these clauses, wherein the connection assembly is connected to the shaft through a splined connection, and wherein the actuator is coupled to the connection assembly for moving the connection assembly along the centerline relative to the shaft.

The gas turbine engine of one or more of these clauses, wherein the turbomachine further comprises a frame, wherein the stator assembly is coupled to the frame, and wherein the actuator is also coupled to the frame.

The gas turbine engine of one or more of these clauses, wherein the rotating assembly of the turbomachine comprises a plurality of rotor blades, wherein the rotor assembly of the electric machine is coupled to the plurality of rotor blades at a location outward of the plurality of rotor blades along a radial direction of the gas turbine engine.

The gas turbine engine of one or more of these clauses, wherein the plurality of rotor blades is a plurality of compressor rotor blades.

A method of operating an electric machine, the electric machine comprising a stator assembly and a rotor assembly and defining a centerline, the method comprising: operating the electric machine to convert electrical power to rotational power, to convert rotational power to electrical power, or both while the rotor assembly is in a first position relative to the stator assembly; receiving information indicative of a fault condition within the electric machine; and moving one of the rotor assembly or stator assembly relative to the other of the rotor assembly or stator assembly along the centerline of the electric machine from the first position to a second position in response to receiving information indicative of the fault condition within the electric machine, the rotor assembly positioned closer to the stator assembly in the first position than in the second position.

The method of one or more of these clauses, wherein moving the rotor assembly relative to the stator assembly along the centerline of the electric machine from the first position to the second position comprises moving the rotor assembly relative to the stator assembly along the centerline of the electric machine from the first position to the second position with an actuator coupled to the rotor assembly.

The method of one or more of these clauses, wherein the rotor assembly and stator assembly together define an air gap therebetween, wherein the air gap defines an angle relative to the centerline greater than zero degrees and less than 90 degrees, and wherein moving the rotor assembly relative to the stator assembly along the centerline of the electric machine from the first position to a second position comprises moving the rotor assembly relative to the stator assembly along the centerline of the electric machine at least 0.5 inches and less than 10 inches.

What is claimed is:

1. An electric machine defining a centerline and comprising:
    a stator assembly defining a first surface;
    a rotor assembly rotatable relative to the stator assembly about the centerline and defining a second surface opposing the first surface, the rotor assembly comprises a connection assembly and a rotor, the connection assembly extends between a shaft of a turbomachine and the rotor, the connection assembly being connected to the shaft through a splined connection, the shaft being rotatable with a turbine of the turbomachine;
    an air gap formed between the first surface and the second surface that corresponds to a minimum distance between the stator assembly and the rotor assembly; and
    an actuator coupled to the connection assembly for moving the connection assembly along the centerline relative to the shaft so as to move the rotor assembly between a first position and a second position,
    wherein the minimum distance is less in the first position than in the second position.

2. The electric machine of claim 1, wherein the first position is an engaged position, and wherein the second position is a disengaged position.

3. The electric machine of claim 1, wherein the air gap defines an angle relative to the centerline greater than zero degrees and less than 90 degrees.

4. The electric machine of claim 3, wherein the angle defined by the air gap relative to the centerline is greater than 10 degrees and less than 45 degrees.

5. The electric machine of claim 3, wherein the air gap is equal to a first value when the rotor assembly is in the first position and is equal to a second value when the rotor assembly is in the second position, and wherein the second value is at least two times larger than the first value and up to 200 times larger than the first value.

6. The electric machine of claim 3, wherein the actuator is configured to move the rotor assembly a distance along the centerline of the electric machine between the first position and the second position, wherein the distance is greater than 0.5 inches and less than 10 inches.

7. The electric machine of claim 6, wherein the distance is greater than 1 inch and less than 5 inches.

8. The electric machine of claim 1, further comprising:
a controller operable with the actuator, wherein the controller is configured to move the rotor assembly from the first position to the second position in response to receiving data indicative of a fault within the electric machine.

9. The electric machine of claim 1, wherein the actuator is further configured to move the rotor assembly along the centerline to a partial power position located between the first position and the second position.

10. The electric machine of claim 1, wherein the actuator is coupled to the rotor assembly for moving the rotor assembly relative to the stator assembly.

11. The electric machine of claim 1, wherein the actuator moves the rotor assembly, the stator assembly, or both along the centerline between the first position and the second position.

12. A gas turbine engine defining an engine centerline and comprising:
a turbomachine comprising a turbine and a rotating assembly configured to rotate about the centerline, the rotating assembly comprises a shaft rotatable with the turbine; and
an electric machine defining an electric machine centerline, the electric machine comprising
a stator assembly defining a first surface;
a rotor assembly rotatable with the rotating assembly of the turbomachine relative to the stator assembly about the electric machine centerline and defining a second surface opposing the first surface, the rotor assembly also comprises a connection assembly and a rotor, and wherein the connection assembly extends between the shaft and the rotor;
an air gap formed between the first surface and the second surface that corresponds to a minimum distance between the stator assembly and the rotor assembly; and
an actuator coupled to the connection assembly for moving the connection assembly along the electric machine centerline relative to the shaft so as to move the rotor assembly between a first position and a second position, the connection assembly being connected to the shaft through a splined connection, and wherein the minimum distance is less in the first position than in the second position.

13. The gas turbine engine of claim 12, wherein the air gap defines an angle relative to the electric machine centerline greater than zero degrees and less than 90 degrees.

14. The gas turbine engine of claim 12, wherein the turbomachine further comprises a frame, wherein the stator assembly is coupled to the frame, and wherein the actuator is also coupled to the frame.

15. The gas turbine engine of claim 12, wherein the rotating assembly of the turbomachine comprises a plurality of rotor blades, wherein the rotor assembly of the electric machine is coupled to the plurality of rotor blades at a location outward of the plurality of rotor blades along a radial direction of the gas turbine engine.

16. A method of operating an electric machine,
the electric machine comprising:
a stator assembly defining a first surface,
a rotor assembly defining a second surface opposing the first surface, the rotor assembly comprises a connection assembly and a rotor, the connection assembly extends between a shaft of a turbomachine and the rotor, the connection assembly being connected to the shaft through a splined connection, the shaft being rotatable with a turbine of the turbomachine, and
an air gap formed between the first surface and the second surface and corresponding to a minimum distance between the stator assembly and the rotor assembly,
the electric machine defining a centerline,
the method comprising:
operating the electric machine to convert electrical power to rotational power, to convert rotational power to electrical power, or both while the rotor assembly is in a first position relative to the stator assembly;
receiving information indicative of a fault condition within the electric machine; and
moving, with an actuator coupled with the connection assembly, the connection assembly so as to move the rotor assembly relative to the stator assembly along the centerline of the electric machine from the first position to a second position in response to receiving information indicative of the fault condition within the electric machine,
wherein the minimum distance is less in the first position than in the second position.

17. The method of claim 16, wherein the air gap defines an angle relative to the centerline greater than zero degrees and less than 90 degrees, and wherein moving the rotor assembly relative to the stator assembly along the centerline of the electric machine from the first position to a second position comprises moving the rotor assembly relative to the stator assembly along the centerline of the electric machine at least 0.5 inches and less than 10 inches.

* * * * *